US012404165B2

(12) United States Patent
Elliot

(10) Patent No.: US 12,404,165 B2
(45) Date of Patent: *Sep. 2, 2025

(54) INVERSE STIRRUP

(71) Applicant: David Elliot, San Diego, CA (US)

(72) Inventor: David Elliot, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/595,246

(22) Filed: Mar. 4, 2024

(65) Prior Publication Data

US 2024/0253973 A1 Aug. 1, 2024

Related U.S. Application Data

(63) Continuation of application No. 18/103,668, filed on Jan. 31, 2023, now Pat. No. 11,919,767.

(51) Int. Cl.
*B68C 3/00* (2006.01)

(52) U.S. Cl.
CPC ..................................... *B68C 3/00* (2013.01)

(58) Field of Classification Search
CPC .... B68C 3/00; B68C 1/02; B68C 1/16; B68C 1/18; B68C 2003/005; B68C 2003/0066; B68C 1/14; B68C 1/147; B68C 2001/142; B68C 2001/145
See application file for complete search history.

(56) References Cited

U.S. PATENT DOCUMENTS 3,828,521 A 8/1974 Dulaney
2005/0120684 A1* 6/2005 Sparacino ................. B68C 1/16 54/46.1
2006/0130440 A1* 6/2006 Horsey ..................... B68C 1/14 54/23
2015/0266716 A1* 9/2015 Elliot ........................ B68C 1/16
2022/0250900 A1* 8/2022 Engelke .................... B88C 3/00

* cited by examiner

*Primary Examiner* — Joshua J Michener
*Assistant Examiner* — Henry Hooper Mudd
(74) *Attorney, Agent, or Firm* — Nathaniel A. Wickliffe

(57) ABSTRACT

An inverse stirrup for use in horseback riding that a horseback rider contacts with the top of the rider's foot to resist upward or transverse force and maintain position on the horse. The inverse stirrup is attached to the horse by means of a circumferential or semi-circumferential strap such as the girth strap passing beneath the horse such that the inverse stirrup resists displacement upward.

20 Claims, 4 Drawing Sheets

INVERSE STIRRUP

CROSS-REFERENCES TO RELATED APPLICATIONS

None

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND

Technical Field of the Invention

The present invention is in the field of horseback riding equipment. More particularly, the present invention is in the field of horseback riding equipment that horseback riders use by contacting with their feet.

Description of the Related Art

The contemporary conventional horseback-riding system includes a saddle attached to the horse by means of a girth strap, and stirrups which hang from the saddle by means of straps called stirrup leathers, or fenders on a Western saddle, although these straps may be made from materials other than leather. This system is the product of centuries of design evolution thought to have begun with a single simple leather toe-loop attached to a saddle used by early barefoot riders to mount the horse and culminating in the current system.

In the current conventional system, the stirrup typically consists of a rounded oblong metal loop with a flat base. The horseback rider inserts his or her foot into the stirrup and rests the sole of the foot on the upper surface of the flat base of the stirrup. The strap from which the stirrup hangs transfers to the saddle any downward force exerted by the sole of the rider's foot on the stirrup base.

That system, with stirrups hanging from stirrup leathers, allows the rider to rest his or her feet, to press down in order to resist downward forces, to rise from a seated position in the saddle, and to shift or distribute the rider's weight between the saddle and the rider's feet.

Because in this conventional system the stirrup hangs freely from a strap or straps attached to the saddle, that stirrup can only directly resist force exerted downward through the rider's foot. Such a system is therefore of only limited effectiveness when a rider is subjected to upward or sideward forces, for example when the horse is in a state of upset and bolts, bucks, or rears up.

In addition, horseback riders in mounted sports such as horse-racing and polo must often maintain difficult body positions and control their horses while maneuvering at high speed. Even the most skillful of riders—jockeys and horse-jumping competitors, for example—can sometimes be subjected under these conditions to displacing forces of such magnitude that the rider is unable to avoid being thrown from the horse. And novice riders, especially when learning how to jump obstacles on horseback, are highly susceptible to being thrown from the horse and may be in danger of serious, even fatal, injury thereby, because the horseback riding system they use provides little or no means to resist the associated upward and transverse forces in these instances of rapid acceleration or deceleration.

Related art discloses various types of proposed safety saddles and safety stirrups. Information relevant to attempts to address the problem of horseback rider safety and stability can be found, for example, in U.S. Pat. Nos. 5,735,109, 5,901,531, 6,298,640, 5,284,005, 7,225,602, 7,526,904, and 7,506,493, U.S. Application Patent Nos. 20060248863 and 20050120684, and European Patent EP3305718B1. However, each of these references suffers from one or more of the disadvantages that the disclosed invention either provides no means to resist upward displacing forces, cannot reliably and flexibly be used by the rider to resist upward displacing forces while in customary riding positions, or interferes with the rider's normal ability to dismount or to stand or move in the saddle. None of these systems provide the benefits of the herein-described invention.

The related art described in Elliot patent No. U.S. Pat. No. 9,718,667 fulfills the same need as the invention described herein but with a different functional technology and does not claim the same functional embodiments or have the same advantages as the herein-described invention. The herein-described invention is a novel, useful, and non-obvious improvement on the art described in Elliot.

Hence, there is a need for this new inverse stirrup that a horseback rider can use to resist vertical and transverse displacing forces and maintain the rider's position on the horse under difficult conditions.

SUMMARY

The present invention is an inverse stirrup for use in horseback riding comprising a flexible, semi-flexible, or rigid strap terminating at the distal end in a rigid or semi-rigid concave element that is contacted by the upper surface of the rider's foot when in use, the said strap attached to a second strap such as the saddle girth strap passing circumferentially underneath the horse and fixed in place such that the rider may use the inverse stirrup to resist upward or lateral displacement.

A conventional stirrup hangs freely from stirrup leathers and only resists forces transmitted downward through the bottom of the rider's foot. An "inverse stirrup" as that term is defined and used herein is a stirrup that is fastened to the horse's tack such that the inverse stirrup resists upward displacement from forces transmitted through the upper surface of the rider's foot.

The horse rider may therefore use the inverse stirrup of the present invention to resist upward or transverse forces that could otherwise dislodge the rider from the saddle or eject the rider from the horse.

As the prior art other than the Elliot patent referenced above fails to teach a system, a stirrup, or a modification thereof capable of being used by the rider in this manner to resist upward displacing forces, and the invention described herein substantially, usefully, and non-obviously distinguishes over and improves upon the invention of the prior Elliot patent, this disclosure teaches advantages and benefits distinguished over the prior art.

These and other aspects, advantages, and features of the invention will become better understood from the description of the invention and appended claims, considered along with the accompanying drawings.

BRIEF DESCRIPTION OF THE DRAWINGS

Illustrated in the accompanying drawings is at least one of the best mode embodiments of the present invention.

DETAILED DESCRIPTION

Figure 1:
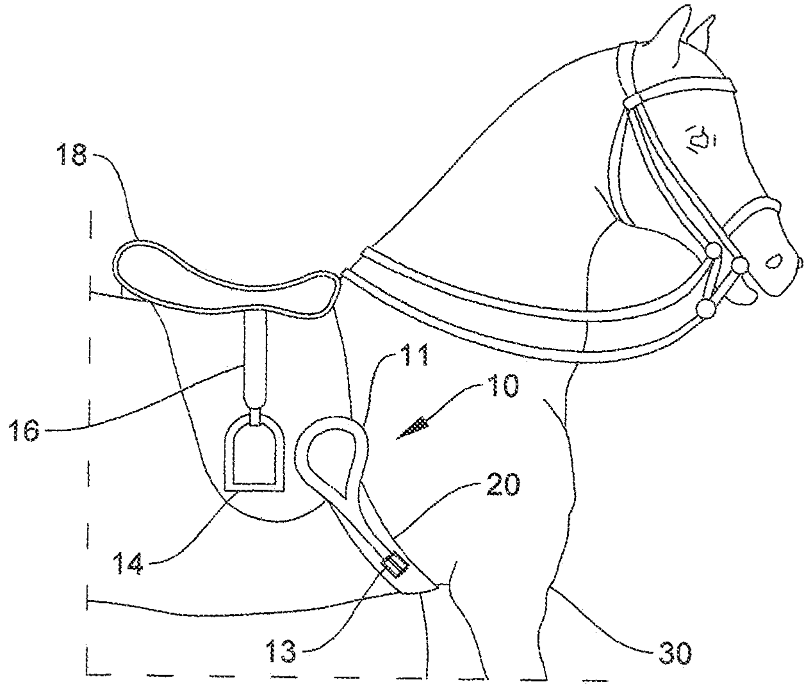
FIG. 1 is a side view of one embodiment of the present invention, showing an inverse stirrup attached to a girth strap passing underneath the horse, the inverse stirrup as shown in use located next to a conventional stirrup that hangs from a stirrup leather attached to the saddle.

The above-described figures illustrate the present invention and its method of use in at least one of its preferred, best mode embodiments, as further defined in detail in the following description.

The present invention is an inverse stirrup for use in horseback riding that is attached to the horse's tack such that the stirrup will resist upward displacing forces on, and upward movement of, the stirrup.

In general equestrian usage, the word "tack" is a collective noun that may be used to refer to any equipment that is placed on the horse to facilitate riding.

For purposes of this patent application, and as used herein, the word "tack" is defined specifically as the more limited group consisting of:

1. the saddle;
2. a strap such as the girth strap that partially encircles the horse passing beneath the horse's underside and is attached to the saddle;
3. a strap such as a surcingle or overgirth that fully encircles the horse and need not be attached to the saddle.

In different embodiments of the present invention, the first strap of the inverse stirrup may therefore be attached to a girth strap, to the saddle, or to another strap that passes circumferentially beneath the horse and partially or fully encircles the horse.

The inverse stirrup of the present invention disclosed therefore allows a rider to apply force using the top surface of their feet on the concave element of the inverse stirrup to resist upward or sideward forces acting on the rider. The inverse stirrup allows the rider to maintain position, stability, and control while mounted on horseback when subjected to forces that could otherwise displace the rider or eject the rider from the horse.

Referring now to the inverse stirrup of the present invention in more detail, in FIG. 1 to FIG. 8 there is shown an inverse stirrup 10, 12, attached to the horse's tack 18, 20, by a fastener 13, 28 or multiple fasteners 13, 28, the horseback rider contacting the concave element 11, 15 with the upper surface of the horseback rider's foot 40 to resist upward or transverse forces on the rider.

Figure 2:
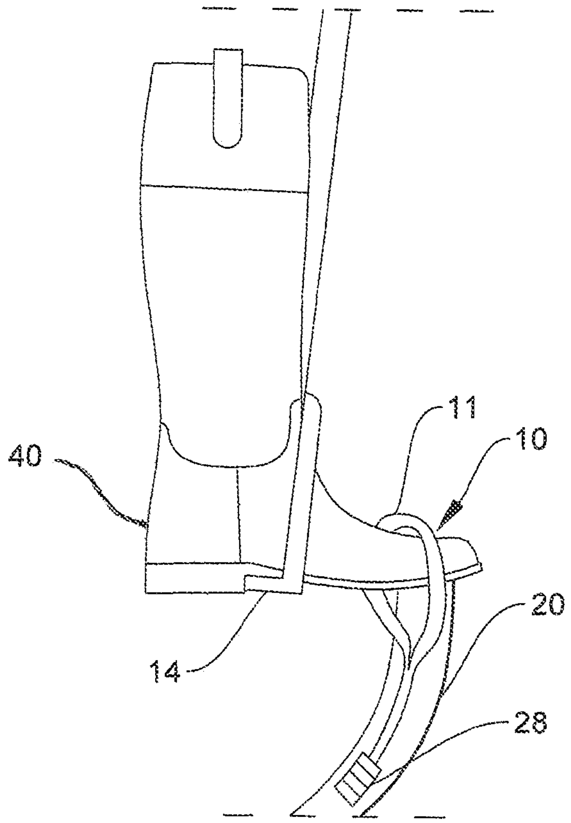
FIG. 2 is a side view of one embodiment of the present invention, showing a rider's foot inserted through a conventional horseback riding stirrup and then inserted into the concave distal element of an inverse stirrup of the present invention, the inverse stirrup attached to a girth strap or other strap partially or fully encircling the horse.

FIG. 1 and FIG. 2 also show a conventional stirrup 14, which hangs from a stirrup leather 16 attached to the saddle 18; these elements 14, 16, 18 of the conventional horseback riding system are shown for ease of visualizing the inverse stirrup 10, 12 of the present invention when it is in use. The saddle 18, conventional stirrup 14, and stirrup leather 16, are not part of the present invention.

Turning to FIG. 1, FIG. 1 shows an inverse stirrup 10 of the present invention attached to a strap 20 passing underneath the horse 30, the strap 20 affixed to the saddle 18. FIG. 1 shows the inverse stirrup 10 of the present invention and the concave element 11 at the distal end and its preferred location with respect to a conventional stirrup 14 when the conventional stirrup 14 and the inverse stirrup 10 of the present invention are used simultaneously.

Turning to FIG. 2, FIG. 2 shows an embodiment of the present invention 10 in use simultaneously with a conventional horseback riding stirrup 14. FIG. 2 shows a horseback rider's foot 40 inserted first through a conventional stirrup 14, then inserted into the concave element 11 of an inverse stirrup 10 of the present invention, the inverse stirrup 10 attached to a girth strap 20 by means of attachment means 28.

Figure 3:
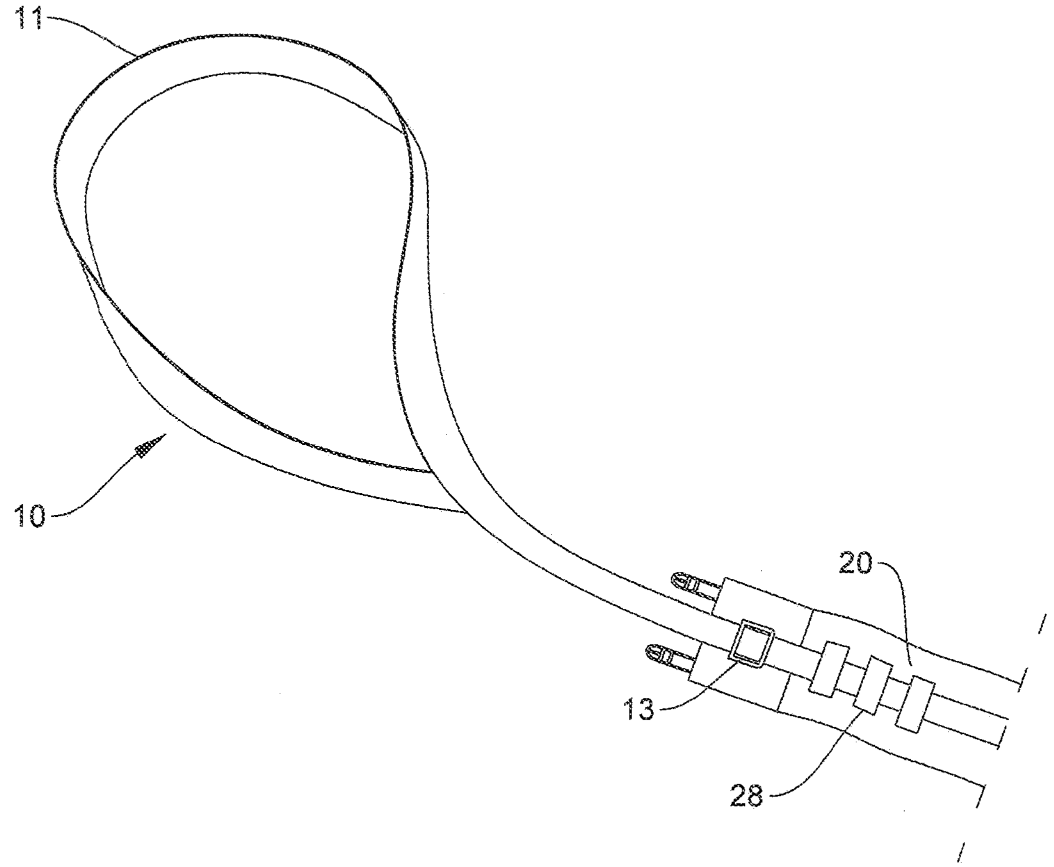
FIG. 3 is a plan view of one embodiment of the present invention, showing the inverse stirrup attached to a girth strap or other strap by attachment means on the inverse stirrup and girth strap, the attachment means adapted to allow for the adjustment of the position of the inverse stirrup repositionably on the girth strap or other tack.

Turning to FIG. 3, FIG. 3 shows an embodiment of the present invention 10 which includes attachment means 13 on the inverse stirrup 10 and attachment means 28 on the tack 20, the two attachment means 13, 28 connecting the inverse stirrup 10 to the tack 20 and allowing for the adjustment of the position of the inverse stirrup 10 repositionably on the tack 20.

Figure 4:
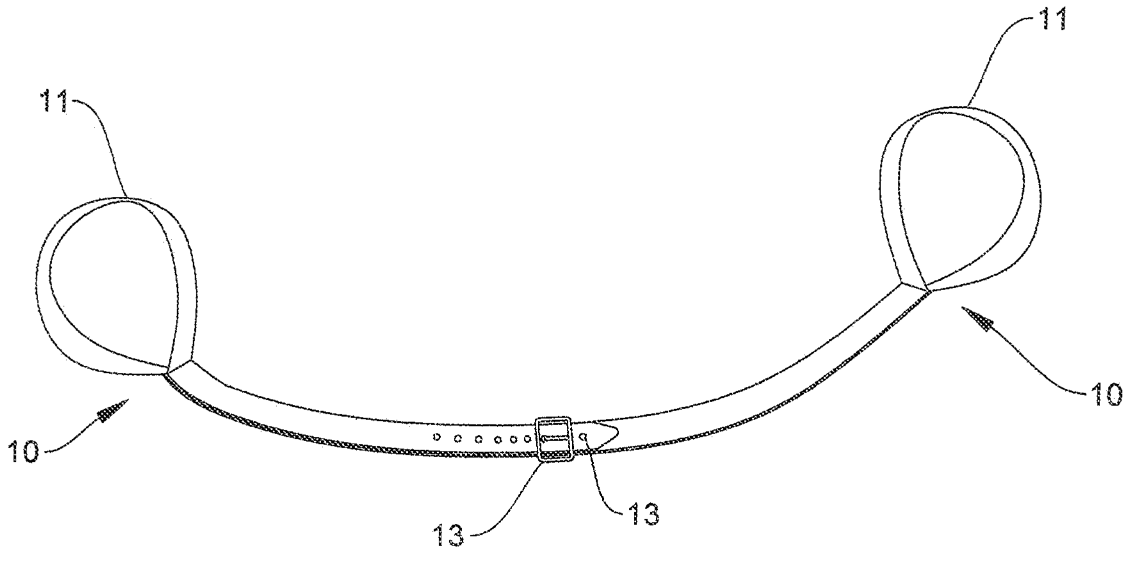
FIG. 4 is a plan view of one embodiment of the present invention, showing two inverse stirrups joined at the proximal end of each with attaching means.

Turning to FIG. 4, FIG. 4 shows an embodiment of the present invention comprising two inverse stirrups 10, 10 of the present invention, the two inverse stirrups 10, 10 connected at their respective proximal ends by connecting means 13, 13, the connecting means 13, 13 adapted to allow for adjustment of the combined length of the two inverse stirrups 10, 10 and accordingly allow for adjustment of the position of the concave elements 11, 11 at the distal ends of the two inverse stirrups 10, 10 relative to the tack 18, 20 and the rider's foot 40.

Figure 5:
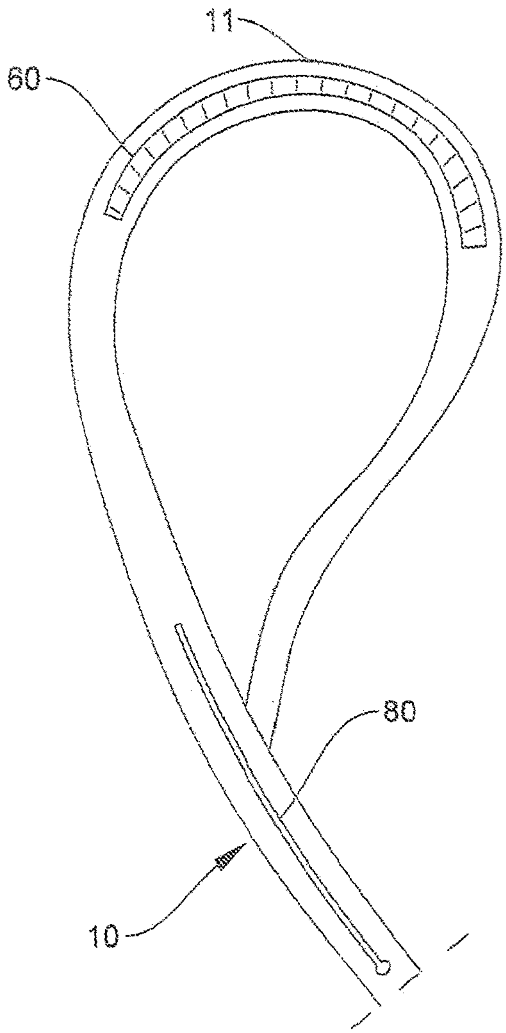
FIG. 5 is a section view of one embodiment of the present invention, showing an embodiment of the inverse stirrup that includes rigid or semi-rigid reinforcing means within the concave element at the distal end of the strap to increase the rigidity of the concave element, as well as longitudinal reinforcing means incorporated in the strap to increase the plasticity of the strap.

Turning to FIG. 5, FIG. 5 shows embodiments of the inverse stirrup 10 of the present invention in which the concave form 11 at the distal end of the inverse stirrup 10 is reinforced with rigid or semi-rigid concave reinforcing means 60; the inverse stirrup 10 reinforced with linear reinforcing means 80; in some embodiments both these elements 60, 80 simultaneously are present in an embodiment of the inverse stirrup 10, 12.

Figure 6:
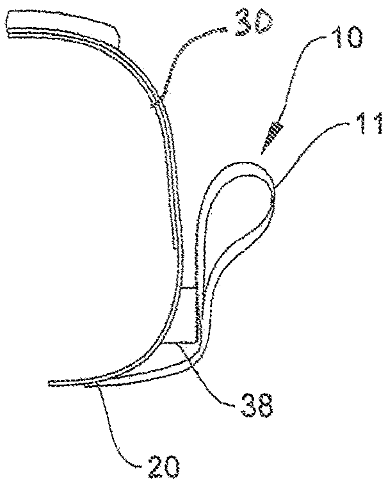
FIG. 6 is a section view of one embodiment of the present invention, showing the inverse stirrup attached to a spacer or stand-off which offsets the distal end of the inverse stirrup away from the body of the horse.

Turning to FIG. 6, FIG. 6 shows an embodiment of the present invention in which the inverse stirrup 10, 12 is offset from the horse's body by means of a stand-off or spacer 38, the spacer 38 attached to the inverse stirrup 10, 12 and to the horse's tack 18, 20, the spacer displacing the location of the concave element 11, 12 away from the horse's body 30.

Figure 7:
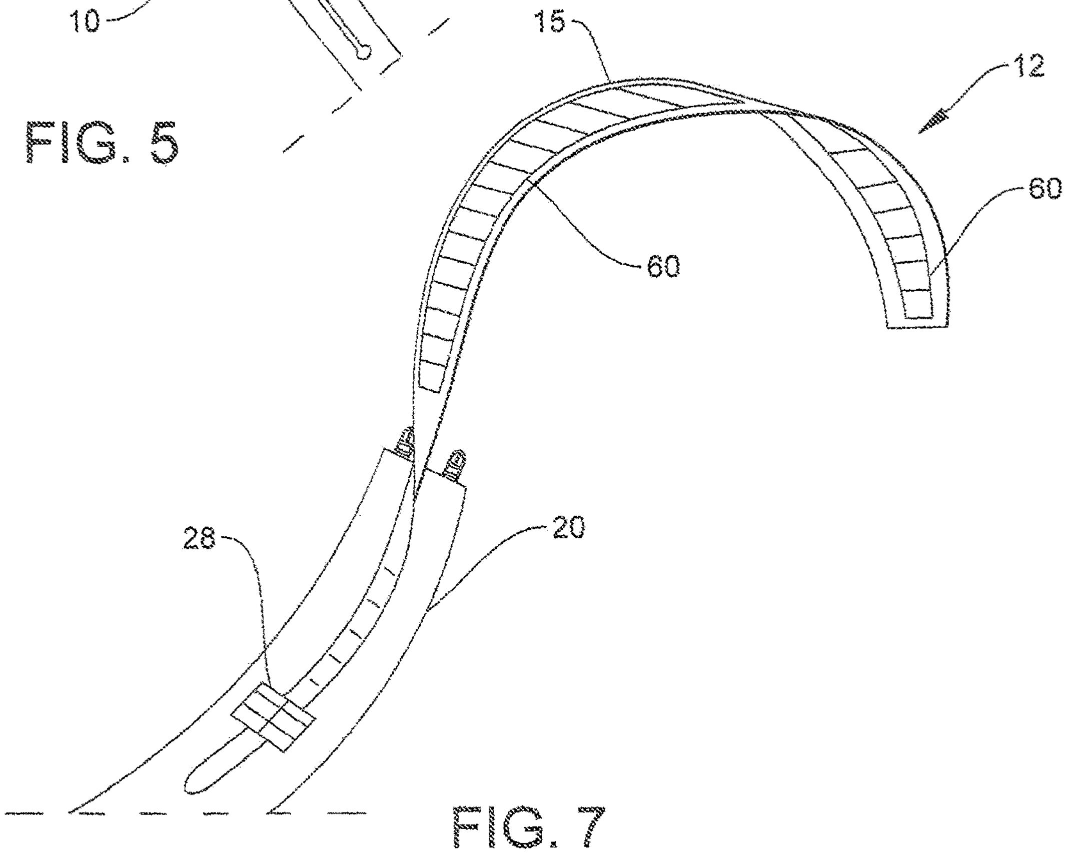
FIG. 7 is a side view of one embodiment of the present invention in which the concave element at the distal end of the inverse stirrup forms an open concave shape that is free at one end.

FIG. 7 depicts embodiments of the inverse stirrup 12 of the present invention in which the concave element 15 at the distal-end of the inverse stirrup 12 is an open shape—a semi-circular form or partial loop—rather than a closed loop. In these open-shape embodiments, the inverse stirrup 12 is free at the distal end rather than terminating at the distal end in a closed-loop. FIG. 7 shows an embodiment of the inverse stirrup 12 of the present invention attached to the tack 20 with connecting means 28, in which the concave element 15 at the distal end of the inverse stirrup 12 is an open concave form rather than a closed concave form, the open concave form reinforced with concave reinforcing means 60.

Figure 8:
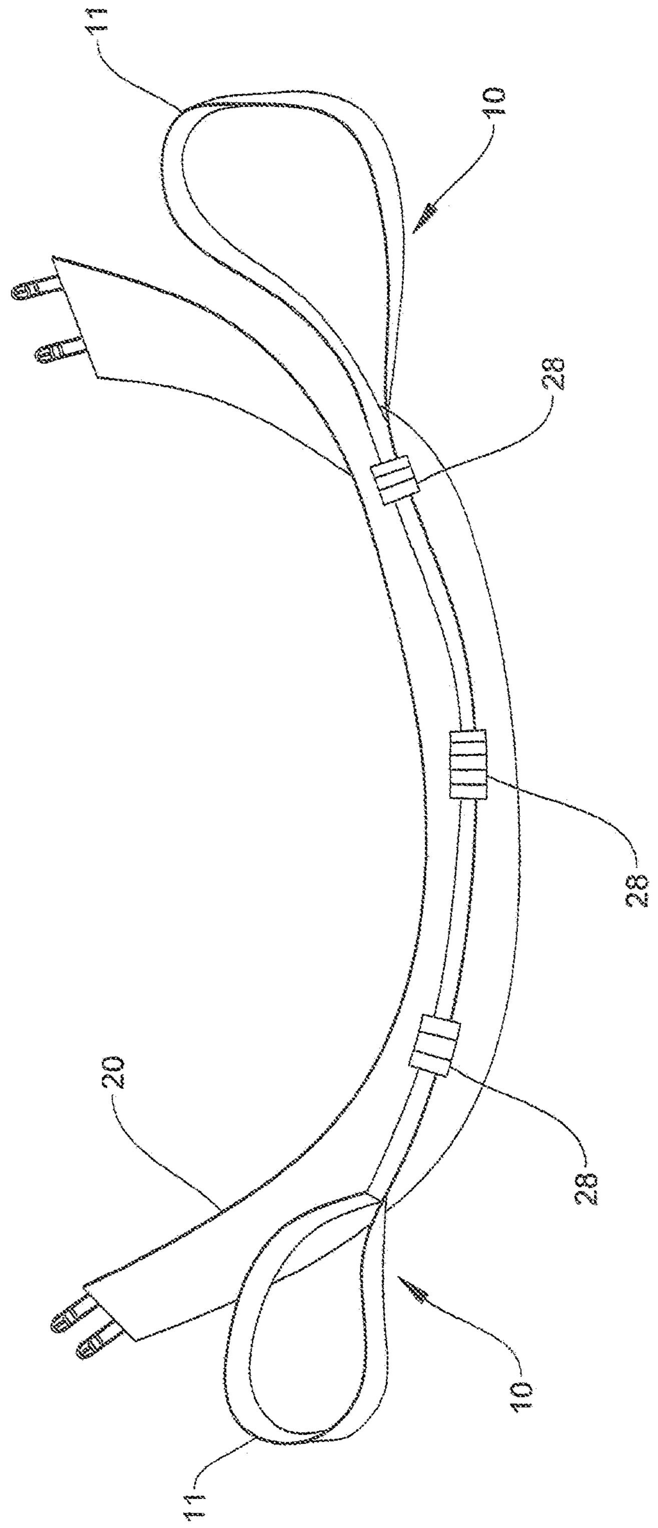
FIG. 8 is a plan view of one embodiment of the present invention showing an inverse stirrup of the present invention incorporated into a girth strap.

Turning to FIG. 8, FIG. 8 shows an embodiment of the inverse stirrup 10, 12 of the present invention comprising a girth strap 20 adapted to incorporate and incorporating an inverse stirrup 10, 12 attached to the girth strap by attaching means 28 creating an integrated unit of horse tack.

In all these embodiments the inverse stirrup 10, 12 is preferably made of a durable flexible or semi-flexible material such as leather, neoprene, a polymer fabric, or other durable material.

The attachment means 13, 28 on the inverse stirrup 10, 12 and on the tack 18, 20 shown in FIGS. 3, 4, 7 and 8, attaching the inverse stirrup 10, 12 to the tack 18, 20, may be one or more chosen from the following, individually or in combination, or other fastener presently existing or developed in the future that performs the same or similar function:

adhesive, batten, buckle, button, captive fastener, clamp, clasp, cleko, clip, flange, grommet, hasp, latch, loop, pin, retaining ring, clip, rivet, snap fastener, staple, stitch, strap, perforated strap, hook-and-loop fastener, threaded fastener, nut, rod, tie.

In use, one of the presently-described inverse stirrups 10, 12 of the present invention is located on each of the two sides of a horse 30 to allow the rider to use both feet 40, 40 to resist upward or transverse displacing forces.

The linear reinforcing means 80 if incorporated into at least the center portion of the first strap may be chosen from the set of materials including: metal wire, metal plate, polymer plate, composite plate, or other material with similar properties. The linear reinforcing means 80 may have cross-section chosen from the set of geometric cross-sections including cylindrical, oval, square, hexagonal, rectangular, flattened cylindrical, or other cross-section.

The concave rigid or semi-rigid reinforcing means 60 incorporated into at least the distal end of the first strap may be chosen from the set of materials including metal, wood, polymers, composites, or other materials.

Conventional stirrups and the systems incorporating them are designed to resist downward forces imparted by the rider's foot. The disclosed inverse stirrup of the present invention serves the inverse function: it resists upward forces. In conventional horseback riding systems, the stirrups are attached to the horse by means of straps called stirrup leathers which hang freely from the saddle. Prior art systems other than Elliot, below, are not capable of resisting upward forces as the stirrups of those systems are not otherwise attached to the saddle or to the horse.

Compared to the prior art systems and stirrups, the inverse stirrup according to the present invention has substantial advantages. The inverse stirrup according to the present invention provides a substantial benefit to the rider's ability to resist displacing forces and maintain position on the horse.

A prior art search teaches a variety of horseback riding systems and stirrups of various designs and structures. However, the prior art, other than Elliot, U.S. Pat. No. 9,718,667, fails to teach a system or stirrup that can be used effectively to resist upward or transverse displacing forces. The present disclosure distinguishes over the prior art including Elliot providing heretofore unknown advantages as described in the foregoing description.

The innovations described in detail above are considered novel over the prior art of record and are considered critical to the operation of at least one aspect of the apparatus and its method of use and to the achievement of the above-described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are also meant to include not only the combination of elements which are literally set forth, but all equivalent structure, material or acts for performing substantially the same function in substantially the same way to obtain substantially the same result. In this sense it is therefore contemplated that an equivalent substitution of one, two, or more elements may be made for any one of the elements described and its various embodiments or that a single element may be substituted for two or more elements in a claim.

Those having ordinary skill in the art may be able to make alterations and modifications to what is described herein without departing from the spirit and scope of the present invention. The description included herein should not be taken therefore as a limitation on the scope of the present invention or method of use.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Although this invention has been disclosed in the context of certain preferred embodiments and examples, it therefore will be understood by those skilled in the art that the present invention extends beyond the specifically disclosed embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

I claim:

1. An inverse stirrup for use in horseback riding, comprising:

a first strap having a distal end and a proximal end;

a first concave element at the distal end of the first strap, the first concave element adapted to receive an upper surface of a horseback rider's foot;

a second strap having a distal end and a proximal end;

a concave element at the distal end of the second strap, the second concave element adapted to receive an upper surface of a horseback rider's foot; and an encircling strap adapted to at least partially encircle a horse on a horse's underside, the first strap and the second strap operatively connected to the encircling strap.

2. The inverse stirrup of claim 1, wherein the distal end of the first strap is adapted to be in proximity to a location of a conventional horseback-riding stirrup.

3. The inverse stirrup of claim 1, wherein the concave element at the distal end of the first strap and the concave element at the distal end of the second strap are adapted to resist displacement of the horseback rider's foot upward.

4. The inverse stirrup of claim 1, wherein the encircling strap is a girth strap adapted to be attached at both ends to a horse's saddle.

5. The inverse stirrup of claim 1, wherein the encircling strap is a strap such as a surcingle adapted to fully encircle the horse.

6. The inverse stirrup of claim 1, wherein the concave element at the distal end of the first strap forms a closed loop.

7. The inverse stirrup of claim 1, wherein the concave element at the distal end of the first strap forms an open concave shape free at the distal end.

8. An inverse stirrup for use in horseback riding, comprising:

An inverse stirrup strap having a first end, a second end, and a center portion;

a first concave element adapted to receive an upper surface of a horseback rider's first foot, the first concave element at the first end of the inverse stirrup strap; and a second concave element adapted to receive an upper surface of the horseback rider's second foot the second concave element at the second end of the inverse stirrup strap.

9. The inverse stirrup of claim 8, further comprising an encircling strap, the encircling strap adapted to at least partially encircle a horse on a horse's underside, the inverse stirrup strap operatively connected to the encircling strap.

10. The inverse stirrup of claim 9, further comprising a substantially-rigid spacer element between the inverse stirrup strap and the encircling strap, the substantially rigid spacer element adapted to increase a distance between a horse's body and the concave element at the first end of the inverse stirrup strap.

11. The inverse stirrup of claim 8, wherein the first end of the inverse stirrup strap and the second end of the inverse stirrup strap are adapted to extend on opposite sides of the horse substantially perpendicular to the long axis of the horse and adapted to be in proximity to a location of conventional horseback-riding stirrups.

12. The inverse stirrup of claim 8, wherein the concave element at the first end of the inverse stirrup strap and the concave element at the second end of the inverse stirrup strap are each adapted to resist displacement of the horseback rider's feet upward.

13. The inverse stirrup of claim 8, wherein the inverse stirrup strap further incorporates a substantially-rigid reinforcing means within the concave element at the first end of the inverse stirrup strap.

14. The inverse stirrup of claim 8, wherein at least the center portion of the inverse stirrup strap further incorporates reinforcing means increasing the plasticity of the inverse stirrup strap.

15. An integrated girth-strap inverse stirrup system, comprising:

an first strap having a distal end and a proximal end;

a substantially rigid concave element adapted to receive an upper surface of a horseback rider's foot, the substantially rigid concave element at the distal end of the inverse stirrup strap; and the encircling strap adapted to at least partially encircle a horse on a horse's underside, the first strap operatively connected to the encircling strap, the encircling strap resisting displacement of the attached first strap, the concave element at the distal end of the first strap adapted to resist displacement upward of the horseback rider's foot.

16. The inverse stirrup of claim 15, wherein the substantially rigid concave element is adapted to be in proximity to a location of a conventional horseback riding stirrup.

17. The inverse stirrup of claim 15, wherein the encircling strap is adapted to attach at both ends to a saddle.

18. The inverse stirrup of claim 15, in which the attachment means on the girth strap is adapted to cooperate with an attachment means on the first strap, the two attachment means together adapted to allow the first strap to be attached repositionably on the girth strap.

19. The inverse stirrup of claim 15, further comprising a length-adjusting means adapted to allow the position of the concave element at the distal end of the first strap to be adjusted relative to the position of a horseback rider's foot.

20. The inverse stirrup of claim 15, further comprising a second strap having a proximal end and a distal end, and further comprising a substantially rigid concave element at the distal end of the second strap.

* * * * *